(12) United States Patent
Baruch et al.

(10) Patent No.: US 11,513,988 B1
(45) Date of Patent: Nov. 29, 2022

(54) SYSTEM AND METHOD FOR MULTI-NODE BUFFER TRANSFER

(71) Applicant: EMC IP Holding Company, LLC, Hopkinton, MA (US)

(72) Inventors: Oran Baruch, Tel Aviv (IL); Ronen Gazit, Tel Aviv (IL); Jenny Derzhavetz, Raanana (IL); Yuri Chernyavsky, Petah Tikva (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/381,738

(22) Filed: Jul. 21, 2021

(51) Int. Cl.
*G06F 13/28* (2006.01)
*G06F 12/0802* (2016.01)

(52) U.S. Cl.
CPC .......... *G06F 13/28* (2013.01); *G06F 12/0802* (2013.01); *G06F 2212/60* (2013.01); *G06F 2213/28* (2013.01)

(58) Field of Classification Search
CPC .. G06F 13/28; G06F 12/0802; G06F 2212/60; G06F 2213/28
See application file for complete search history.

(56) References Cited

U.S. PATENT DOCUMENTS

| 2013/0326146 | A1* | 12/2013 | Abe | G06F 12/084 711/130 |
| 2019/0102087 | A1* | 4/2019 | Shi | G06F 9/45533 |
| 2022/0058068 | A1* | 2/2022 | Jha | G06F 9/542 |

* cited by examiner

*Primary Examiner* — Idriss N Alrobaye
*Assistant Examiner* — Ronald T Modo
(74) *Attorney, Agent, or Firm* — Brian J. Colandreo; Mark H. Whittenberger; Holland & Knight LLP

(57) ABSTRACT

A method, computer program product, and computing system for receiving, at a local node, a request to buffer data on a remote persistent cache memory system of a remote node. A target memory address within the remote persistent cache memory system may be sent from the local node via a remote procedure call (RPC). The data may be sent from the local node to the target memory address within the remote persistent cache memory system via a remote direct memory access (RDMA) command.

14 Claims, 7 Drawing Sheets

SYSTEM AND METHOD FOR MULTI-NODE BUFFER TRANSFER

BACKGROUND

Storing and safeguarding electronic content may be beneficial in modern business and elsewhere. Accordingly, various methodologies may be employed to protect and distribute such electronic content.

For example, each battery backup RAM system of a multi-node storage system may be defined per node without a mirroring connection between each node. Accordingly, when persisting data within a battery backup RAM system to one node (e.g., a local node), data may not automatically be persisted to the other node (e.g., a remote node). Conventional processes for ensuring consistent data between battery backup RAM systems may require multi-node signaling overhead and/or may require many copies of buffered data within the multi-node storage system.

SUMMARY OF DISCLOSURE

In one example implementation, a computer-implemented method executed on a computing device may include, but is not limited to, receiving, at a local node, a request to buffer data on a remote persistent cache memory system of a remote node. A target memory address within the remote persistent cache memory system may be sent from the local node via a remote procedure call (RPC). The data may be sent from the local node to the target memory address within the remote persistent cache memory system via a remote direct memory access (RDMA) command.

One or more of the following example features may be included. The remote persistent cache memory system may include a battery backup random access memory (RAM) system. At least a portion of the remote persistent cache memory system may be allocated, during initialization of the remote node, for buffering data, thus defining one or more buffer portions. A memory address associated with a first buffer portion of the one or more buffer portions may be sent from the remote node. a list of free buffer portions within the remote persistent cache memory system may be generated. The target memory address within the remote persistent cache memory system for buffering the data may be determined based upon, at least in part, the list of free buffer portions within the remote persistent cache memory system. An updated target memory address within the remote persistent cache memory system may be received, from the remote node, via an RPC response. The list of free buffer portions within the remote persistent cache memory system may be updated based upon, at least in part, the updated target memory address. The data to buffer on the remote persistent cache memory system of the remote node may include a cache status bitmap.

In another example implementation, a computer program product resides on a computer readable medium that has a plurality of instructions stored on it. When executed by a processor, the instructions cause the processor to perform operations that may include, but are not limited to, receiving, at a local node, a request to buffer data on a remote persistent cache memory system of a remote node. A target memory address within the remote persistent cache memory system may be sent from the local node via a remote procedure call (RPC). The data may be sent from the local node to the target memory address within the remote persistent cache memory system via a remote direct memory access (RDMA) command.

One or more of the following example features may be included. The remote persistent cache memory system may include a battery backup random access memory (RAM) system. At least a portion of the remote persistent cache memory system may be allocated, during initialization of the remote node, for buffering data, thus defining one or more buffer portions. A memory address associated with a first buffer portion of the one or more buffer portions may be sent from the remote node. a list of free buffer portions within the remote persistent cache memory system may be generated. The target memory address within the remote persistent cache memory system for buffering the data may be determined based upon, at least in part, the list of free buffer portions within the remote persistent cache memory system. An updated target memory address within the remote persistent cache memory system may be received, from the remote node, via an RPC response. The list of free buffer portions within the remote persistent cache memory system may be updated based upon, at least in part, the updated target memory address. The data to buffer on the remote persistent cache memory system of the remote node may include a cache status bitmap.

In another example implementation, a computing system includes at least one processor and at least one memory architecture coupled with the at least one processor, wherein the at least one processor may be configured to receive, at a local node, a request to buffer data on a remote persistent cache memory system of a remote node. The processor may be further configured to send, from the local node, a target memory address within the remote persistent cache memory system via a remote procedure call (RPC). The processor may be further configured to send, from the local node, the data to the target memory address within the remote persistent cache memory system via a remote direct memory access (RDMA) command.

One or more of the following example features may be included. The remote persistent cache memory system may include a battery backup random access memory (RAM) system. At least a portion of the remote persistent cache memory system may be allocated, during initialization of the remote node, for buffering data, thus defining one or more buffer portions. A memory address associated with a first buffer portion of the one or more buffer portions may be sent from the remote node. a list of free buffer portions within the remote persistent cache memory system may be generated. The target memory address within the remote persistent cache memory system for buffering the data may be determined based upon, at least in part, the list of free buffer portions within the remote persistent cache memory system. An updated target memory address within the remote persistent cache memory system may be received, from the remote node, via an RPC response. The list of free buffer portions within the remote persistent cache memory system may be updated based upon, at least in part, the updated target memory address. The data to buffer on the remote persistent cache memory system of the remote node may include a cache status bitmap.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
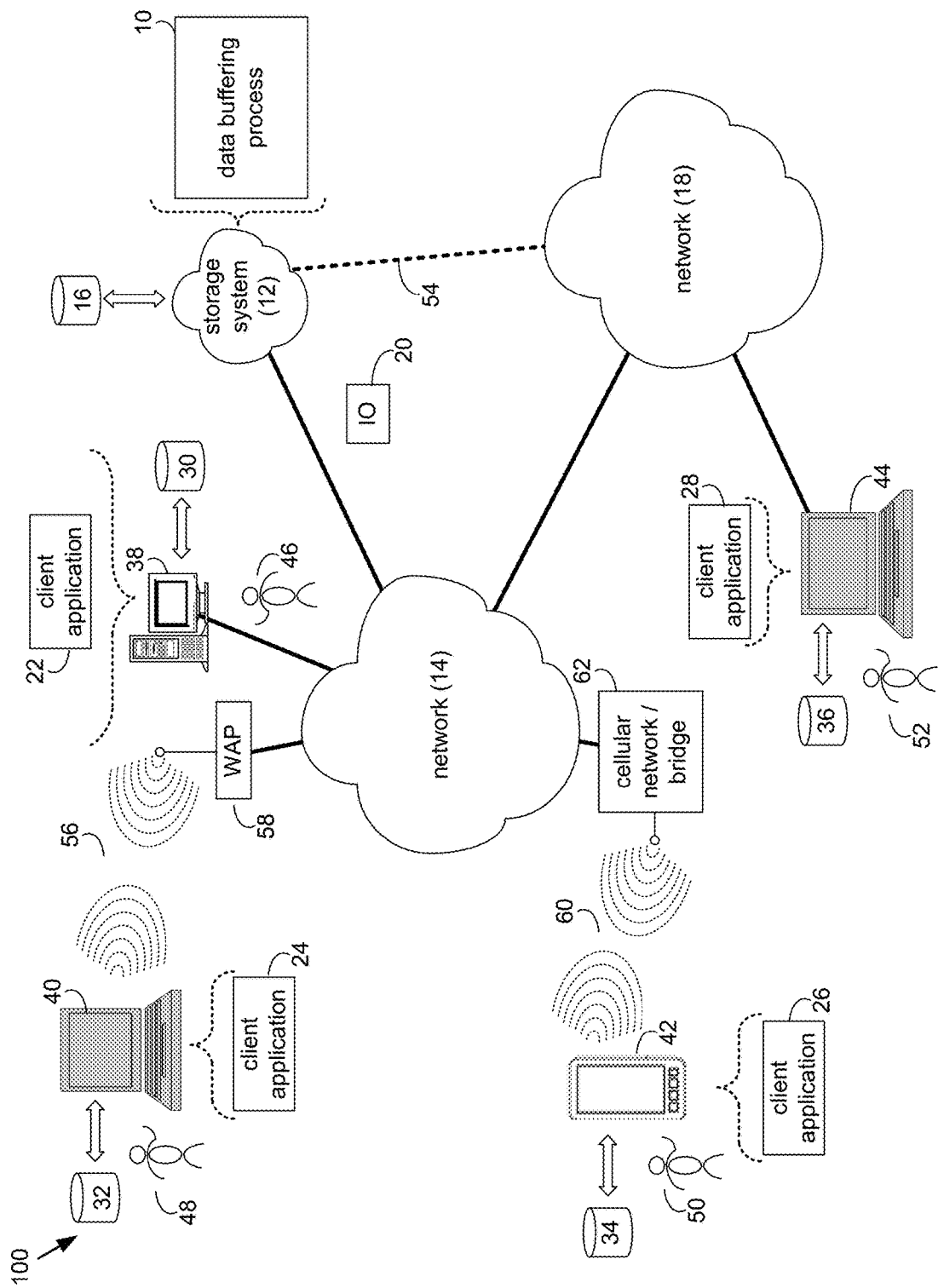
FIG. 1 is an example diagrammatic view of a storage system and a data buffering process coupled to a distributed computing network according to one or more example implementations of the disclosure.

System Overview:

Referring to FIG. 1, there is shown data buffering process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of data buffering process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of data buffering process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a data buffering process, such as data buffering process 10 of FIG. 1, may include but is not limited to, receiving, at a local node, a request to buffer data on a remote persistent cache memory system of a remote node. A target memory address within the remote persistent cache memory system may be sent from the local node via a remote procedure call (RPC). The data may be sent from the local node to the target memory address within the remote persistent cache memory system via a remote direct memory access (RDMA) command.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
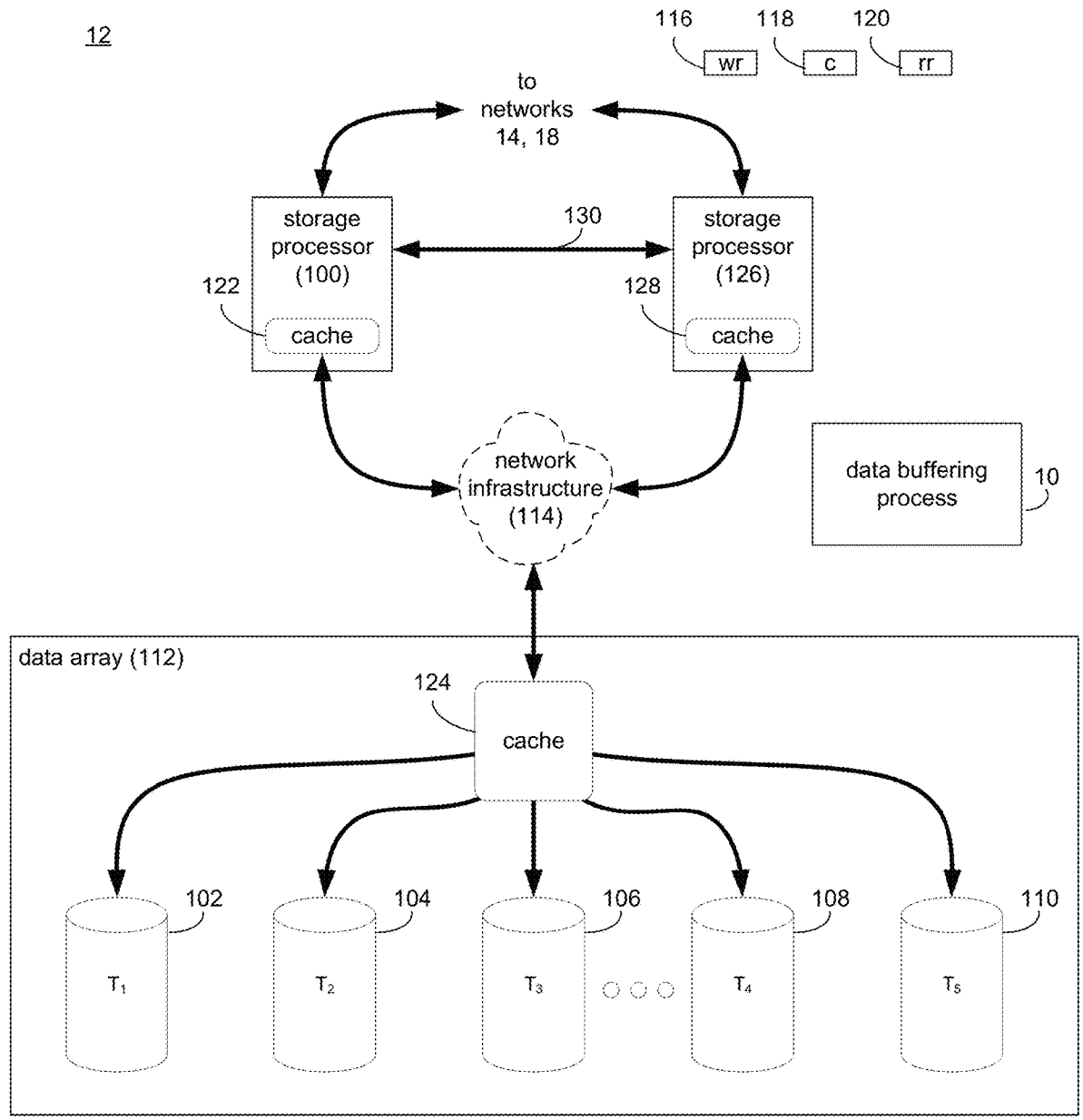
FIG. 2 is an example diagrammatic view of the storage system of FIG. 1 according to one or more example implementations of the disclosure.
Figure 3:
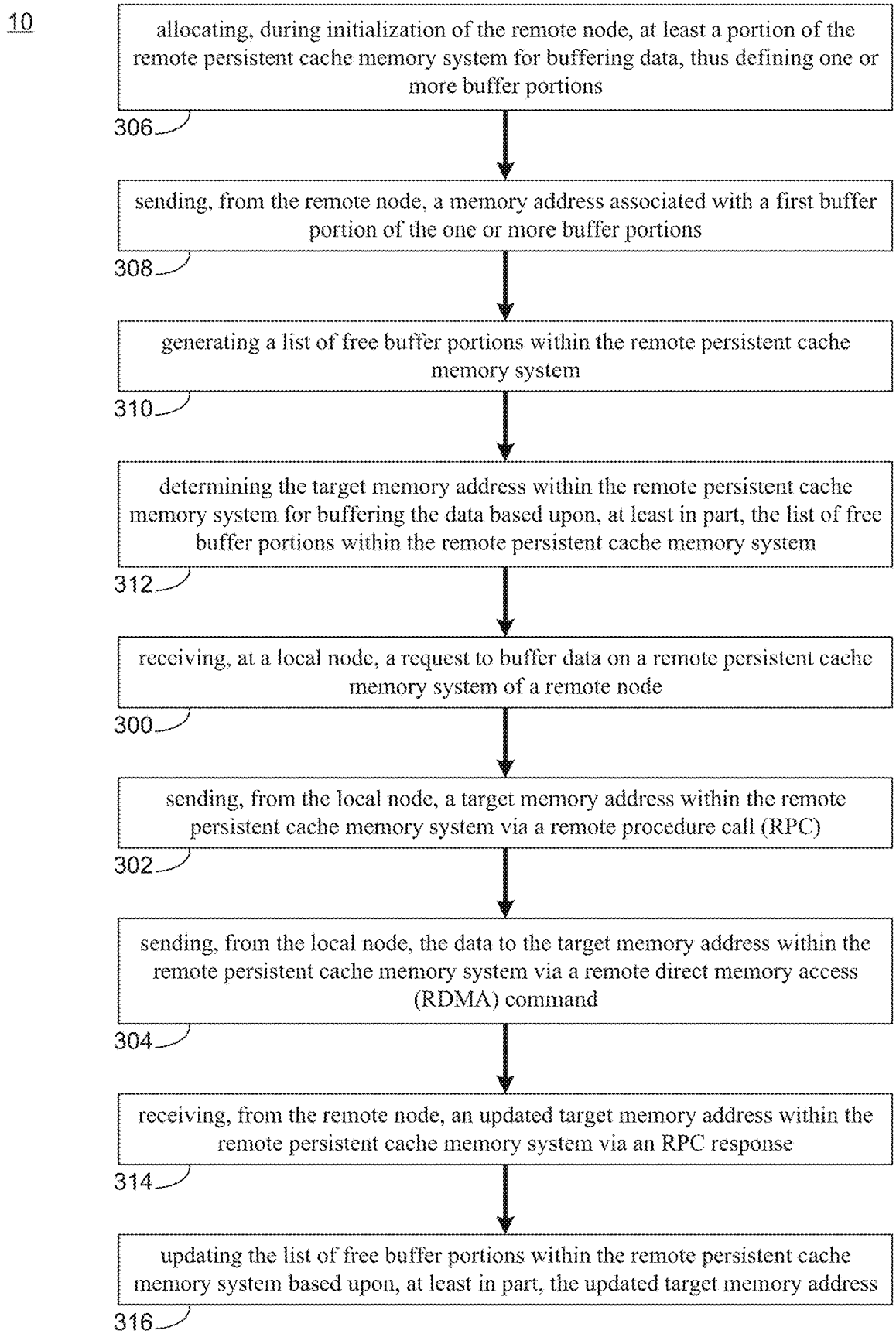
FIG. 3 is an example flowchart of the data buffering process of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniB and network, or any other circuit switched/packet switched network.

Storage system 12 may execute all or a portion of data buffering process 10. The instruction sets and subroutines of data buffering process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of data buffering process 10 may be stored on storage devices (and/or executed by processors and memory architectures) that are external to storage system 12.

As discussed above, various IO requests or commands (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of data buffering process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of data buffering process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of data buffering process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of data buffering process 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130). In some implementations, one of the storage processors may fail which may cause a significant amount of desynchronization between the storage processors.

The Data Buffering Process:

Referring also to FIGS. 3-7 and in some implementations, data buffering process 10 may receive 300, at a local node, a request to buffer data on a remote persistent cache memory system of a remote node. A target memory address within the remote persistent cache memory system may be sent 302 from the local node via a remote procedure call (RPC). The data may be sent 304 from the local node to the target memory address within the remote persistent cache memory system via a remote direct memory access (RDMA) command.

As will be discussed in greater detail below, implementations of the present disclosure may allow for efficient data buffer transfer in a multi-node, battery backup random access memory (RAM) cache memory system. For example, when working with battery backup RAM, each battery backup RAM system may be defined per node without a mirroring connection between each node. Accordingly, when persisting data within a battery backup RAM cache memory system to one node (e.g., a local node), data may not automatically be persisted to the other node (e.g., a remote node).

As will be discussed in greater detail below, data buffering process 10 may transfer the data from one node to another node to provide consistent data across both nodes in persistent memory. In one example, transferring data between nodes may utilize a Non-Transparent Bridge (NTB). As is known in the art, NTB is a type of PCI-Express bridge chip that connects the separate memory systems of two or more computers to the same PCI-Express fabric. NTB may transfer data using a remote direct memory access (RDMA) write or RDMA read that includes sending a remote procedure call (RPC) to the other node and then performing an RDMA write, which will result in an extra RPC for every RDMA command. Accordingly, data buffering process 10 may optimize the transfer of data or data buffer(s) between nodes in a multi-node persistent cache memory system by sending fewer messages between the nodes and by making as few copies of the data as possible. As will be discussed in greater detail below, data buffering process 10 may transfer data from an initiator node (e.g., a local node) directly to a persistent cache memory system of another node (e.g., a remote node) with an RDMA write command without doing an extra copy of the data buffer(s).

Figure 4:
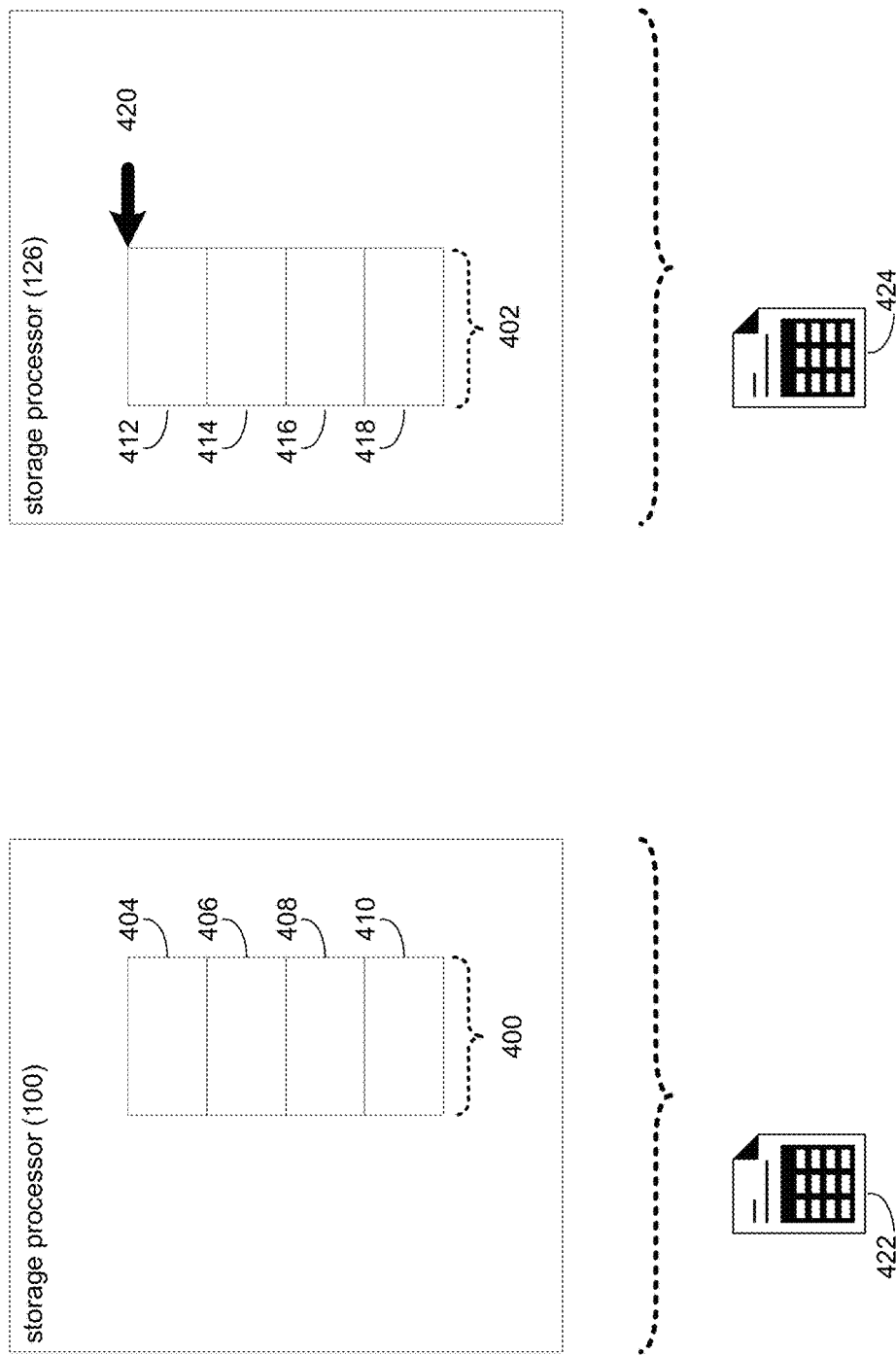
FIGS. 4-7 are example diagrammatic views of the data buffering process within the storage system of FIG. 1 according to one or more example implementations of the disclosure.

As shown in FIG. 2 and in some implementations, a multi-node, battery backup random access memory (RAM) cache memory system may include at least a pair of nodes (e.g., storage processors 100, 126) communicatively coupled to a data array (e.g., data array 112) and communicatively coupled to one another (e.g., via connection 130). Referring also to FIG. 4 and in some implementations, each node (e.g., storage processors 100, 126) may include a persistent cache memory system (e.g., persistent cache memory system 400, 402, respectively). As will be discussed in greater detail below, each node may be configured to communicate with one another to transfer data between each node's persistent cache memory system. Accordingly, a node initiating a transfer of data may be referred to as a "local node" and a node receiving the data may be referred to as a "remote node". It will be appreciated that the local node (e.g., storage processor 100) and the remote node (e.g., storage processor 126) may be positioned physically adjacent to one another or may be positioned in physically separate spaces while being communicatively coupled. Accordingly, the terms "local" and "remote" are for explanation purposes only and do not impose any minimum degree of physical separation between nodes, within the scope of the present disclosure.

The persistent cache memory system (e.g., persistent cache memory systems 400, 402) may include persistent RAM-based storage. As is known in the art, persistent RAM-based storage will not lose its data in the event of e.g., a power failure. Persistent RAM-based storage may be accomplished using various methodologies, such as incorporating an independent battery backup that will maintain the content stored within the RAM-based storage system during a power failure; or utilizing procedures that will rebuild the content stored within the RAM-based storage system after recovery from a power failure. Accordingly and in some implementations, persistent cache memory systems 400, 402 may include a battery backup RAM cache memory system.

In some implementations, data buffering process 10 may allocate 306, during initialization of the remote node, at least a portion of the remote persistent cache memory system for buffering data, thus defining one or more buffer portions. Referring again to FIG. 4 and upon initialization of each node (e.g., storage processors 100, 126), data buffering process 10 may allocate 306 at least a portion of the remote persistent cache memory system (e.g., persistent cache memory system 400, 402, respectively) for buffering data. For example, suppose that persistent cache memory system 400 of storage processor 100 has a plurality of portions (e.g., portions 404, 406, 408, 410) and that persistent cache memory system 402 of storage processor 100 has a plurality of portions (e.g., portions 412, 414, 416, 418). In this example, suppose data buffering process 10 allocates portions 404 and 406 of persistent cache memory system 400 of a local node (e.g., storage processor 100) for buffering data (e.g., buffer portions 404, 406) and portions 412 and 414 of persistent cache memory system 402 of a remote node (e.g., storage processor 126) for buffering data (e.g., buffer portions 412, 414). Accordingly and as will be described in greater detail below, data buffering process 10 may allocate buffer portions of the persistent cache memory system from each node for persisting data pages and cache status bitmaps from the local node and/or the remote node.

When allocating 306 the one or more buffer portions from the persistent cache memory system, data buffering process 10 may identify an initial memory address within the persistent cache memory system and a total allocation size for the one or more buffers. In the example of FIG. 4, data buffering process 10 may allocate 306 buffer portions 412 and 414 by identifying an initial memory address within persistent cache memory system 402 (e.g., memory address 420) and a total allocation size for the one or more buffers. While the total allocation size in this example is e.g., two portions of the persistent cache memory system, it will be appreciated that any number of portions, of any size, may be allocated 306 for buffering data within the scope of the present disclosure.

Allocating 306 the one or more buffer portions from the persistent cache memory system may include allocating one or more page data buffers from the one or more buffer portions. For example, data buffering process 10 may allocate 306 buffer portions 412, 414 of various sizes that may be distinct from page sizes typically utilized by cache memory systems. Suppose that buffer portions 412, 414 each represent an equal-sized portion of persistent cache memory system 402. In this example, suppose that buffer portions 412, 414 are sized to include many pages. Accordingly, data buffering process 10 may generate a mapping of pages to buffer portions 412, 414 to allow for particular pages to be identified within persistent cache memory system 402. In one example, data buffering process 10 may generate a hash table to map pages to buffer portions. As shown in the example of FIG. 4, data buffering process 10 may generate hash table 422 for the mapping of pages to buffer portions 404, 406 of persistent cache memory system 400 on the local node (e.g., storage processor 100) and hash table 424 for the mapping of pages to buffer portions 412, 414 of persistent cache memory system 402 on the remote node (e.g., storage processor 126).

Figure 5:
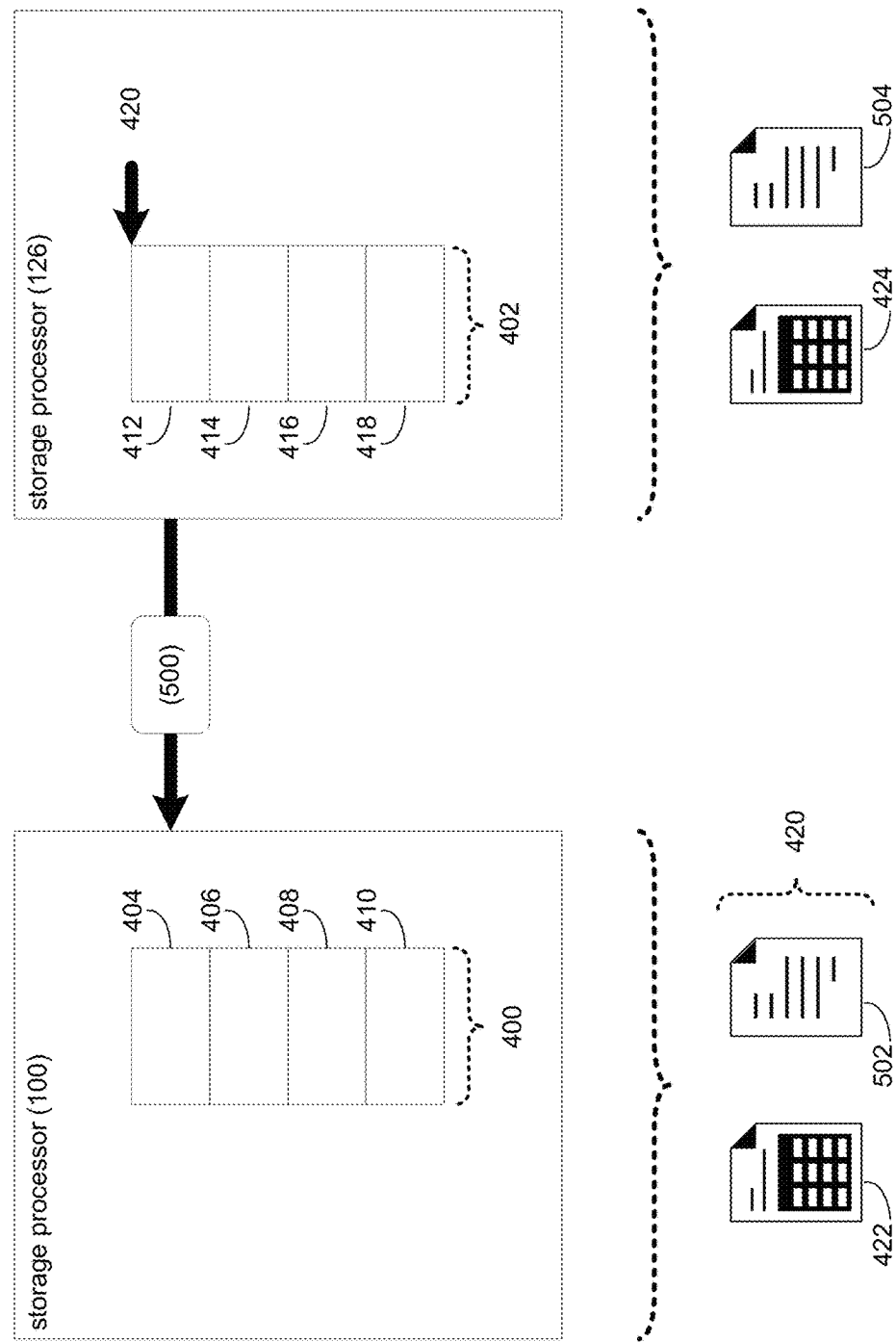

In some implementations, data buffering process 10 may send 308, from the remote node, a memory address associated with a first buffer portion of the one or more buffer portions. Referring also to FIG. 5 and in some implementations, data buffering process 10 may send 308, from the remote node (e.g., storage processor 126), a memory address (e.g., memory address 420) associated with a first buffer portion (e.g., buffer portion 412) of the one or more buffer portions (e.g., buffer portions 412, 414). In this example, data buffering process 10 may send 308 memory address 420 and/or the total allocation size for the one or more buffers using a message (e.g., message 500). In this manner, data buffering process 10 may provide each node with the buffer locations allocated from its respective persistent cache memory system.

In some implementations, data buffering process 10 may generate 310 a list of free buffer portions within the remote persistent cache memory system. Referring again to FIG. 5 and in response to receiving message 500, data buffering process 10 may generate a list of free or unused buffer portions within the remote persistent cache memory system (e.g., list of free buffer portions 502). In this example, list of free buffer portions 502 may include the initial memory address (e.g., memory address 420) for the first buffer portion (e.g., buffer portion 412) of the one or more buffer portions within the remote persistent cache memory system (e.g., persistent cache memory system 402 of storage processor 126). In some implementations, list of free buffer portions 502 may include the total allocation size for the one or more buffer portions within persistent cache memory system 402 of storage processor 126. As shown in FIG. 5, storage processor 126 may be configured to generate a similar list of free or unused buffer portions within persistent cache memory system 400 of storage processor 100 (e.g., list of free buffer portions 504).

Figure 6:
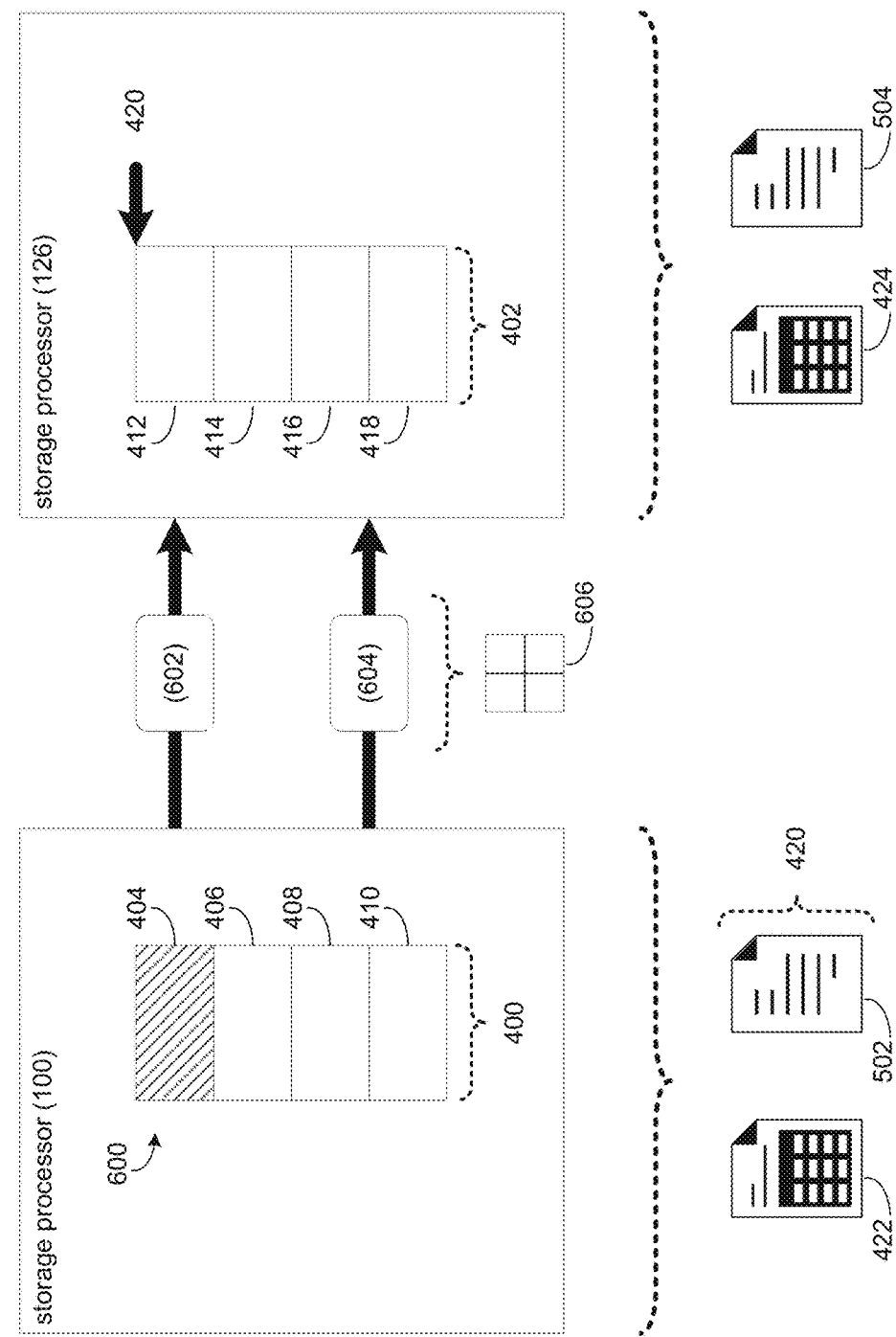

Referring also to FIG. 6 and in some implementations, data buffering process 10 may receive 300, at a local node, a request to buffer data on a remote persistent cache memory system of a remote node. For example, suppose persistent cache memory system 400 includes data 600 within buffer portion 404. In this example, data buffering process 10 may commit data 600 within persistent cache memory system 400 for storage in the remote persistent cache memory system (e.g., persistent cache memory system 402 of storage processor 126). Accordingly, data buffering process 10 may commit data 600 based upon, at least in part, a threshold amount of data being stored within persistent cache memory system 400 of storage processor 100 and/or reaching a threshold amount of data being stored within persistent cache memory system 402 of storage processor 126. In some implementations, the request to buffer data 600 on the remote persistent cache memory system of the remote node may be received by the local node (e.g., storage processor 100) and/or may be generated internally by the local node (e.g., storage processor 100).

Data buffering process 10 may, via the local node, allocate one or more buffer portions from the list of free buffer portions in the size of the number of pages of the commit request. For example and in some implementations, data buffering process 10 may determine 312 the target memory address within the remote persistent cache memory system for buffering the data based upon, at least in part, the list of free buffer portions within the remote persistent cache memory system. Data buffering process 10 may determine 312 a target memory address within persistent cache memory system 402 of storage processor 126 for buffering data using the list of free buffer portions (e.g., list of free buffer portions 502). In this example, data buffering process 10 may determine 312 that memory address 420 is the next free or available buffer address for buffering data within persistent cache memory system 402 of storage processor 126 and may allocate buffer portion 412 for buffering data. As will be discussed in greater detail below, buffer portion 412 may be allocated for persistently caching data 600 in remote persistent cache memory system 402 of storage processor 126. In this manner, data buffering process 10 may reduce the number of times data 600 is copied when persisting to a remote storage node.

In some implementations, data buffering process 10 may send 302, from the local node, a target memory address within the remote persistent cache memory system via a remote procedure call (RPC). As is known in the art, an RPC may generally include a protocol that one program can use to request a service from a program located in another computer on a network without having to understand the network's details. Referring again to FIG. 6, an RPC (e.g., RPC 602) may be sent 302 from the local node (e.g., storage processor 100) to a remote node (e.g., storage processor 126). For example, RPC 602 may include target memory address 420 within persistent cache memory system 402 of storage processor 126 and metadata associated with data 600. As will be discussed in greater detail below, data buffering process 10 may utilize a combination of RPC 602 and an RDMA command to identify a buffer portion in a remote persistent cache memory system and to write the data to the identified buffer portion with minimal signaling overhead between the local node and the remote node.

In some implementations, data buffering process 10 may send 304, from the local node, the data to the target memory address within the remote persistent cache memory system via a remote direct memory access (RDMA) command. As is known in the art, an RDMA command is a command for direct memory access from the memory of one computer into that of another without involving either computer's operating system. With the target memory address of the buffer portion within the remote persistent cache memory system from the first RPC, data buffering process 10 may utilize the combination of the first RPC and the RDMA command to send data directly to the target memory address. Referring again to the example of FIG. 6, data buffering process 10 may send, from the local node (e.g., storage processor 100), the data (e.g., data 600) to the target memory address (e.g., target memory address 420) within the remote persistent cache memory system (e.g., persistent cache memory system 402) via an RDMA command (e.g., RDMA command 604). In this manner, data buffering process 10 may send 304 data 600 directly to buffer portion 412 using target memory address 420 provided in RPC 602 and data 600 provided in RDMA 604. Accordingly, data buffering process 10 may buffer data 600 in buffer portion 412 without sending additional RPC signals or requests from the local node to determine the target memory address within the remote persistent cache memory system of the remote node.

In some implementations, the data to buffer on the remote persistent cache memory system of the remote node may include a cache status bitmap. For example, the amount of data that may be persisted within a persistent cache memory system may be limited during system failure (e.g., because of a limited battery life in a battery backup RAM cache memory system). Additionally, because it may be undesirable to divide between read and write cache memory, the entire cache may be maintained in the persistent cache memory system. Accordingly, data buffering process 10 may utilize a cache status bitmap to determine whether a page is "dirty" or "clean." For example, if a page is dirty, data buffering process 10 may write the page to persistent memory, while also ensuring that the number of dirty pages does not exceed a threshold amount of data that can be copied on battery to the persistent memory.

When the RPC and the RDMA command are received at the remote node, data buffering process 10 may use the buffer portion(s) within the remote persistent cache memory system as a cache entry for the data received from the local node. For example, data buffering process 10 may receive the RPC (e.g., RPC 602) with the target memory address (e.g., target memory address 420), and may process the target memory address in the hash table to find the page data buffer address and remove it from the hash table. Data buffering process 10 may persist the buffer portion(s) (e.g., buffer portion 412) by setting a persistence bit of the respective data page buffer(s) in the remote persistent cache memory system (e.g., persistent cache memory system 402).

Buffer portion 412 may function as a cache entry for data 600 within persistent cache memory system 402. Accordingly, the remote node (e.g., storage processor 126) may process IO requests for data 600 using buffer portion 412 of persistent cache memory system 402 as a cache entry. In this manner, data buffering process 10 may reduce the number of times that data 600 is copied when persisting data 600 in a remote node.

In some implementations, data buffering process 10 may identify, on the remote node, a next free buffer portion from the one or more buffer portions. For example and in response to buffering data 600 with buffer portion 412, data buffering process 10 may identify buffer portion 414 as the next free buffer portion in persistent memory cache system 402. In some implementations, data buffering process 10 may determine that no other buffer portions are free. For example, if buffering data 600 requires all of the allocated buffer portions and/or if data buffering process 10 reallocates the buffer portions for other purposes, data buffering process 10 may determine that there are no additional free buffer portions within remote persistent cache memory system. Accordingly, data buffering process 10 may attempt to allocate one or more new page data buffers in the amount that was sent with RDMA 604 (e.g., in the commit request). When new page data buffers are allocated, data buffering process 10 may add the new page data buffers to the hash table (e.g., hash table 504) generated for the remote node (e.g., storage processor 126).

Figure 7:
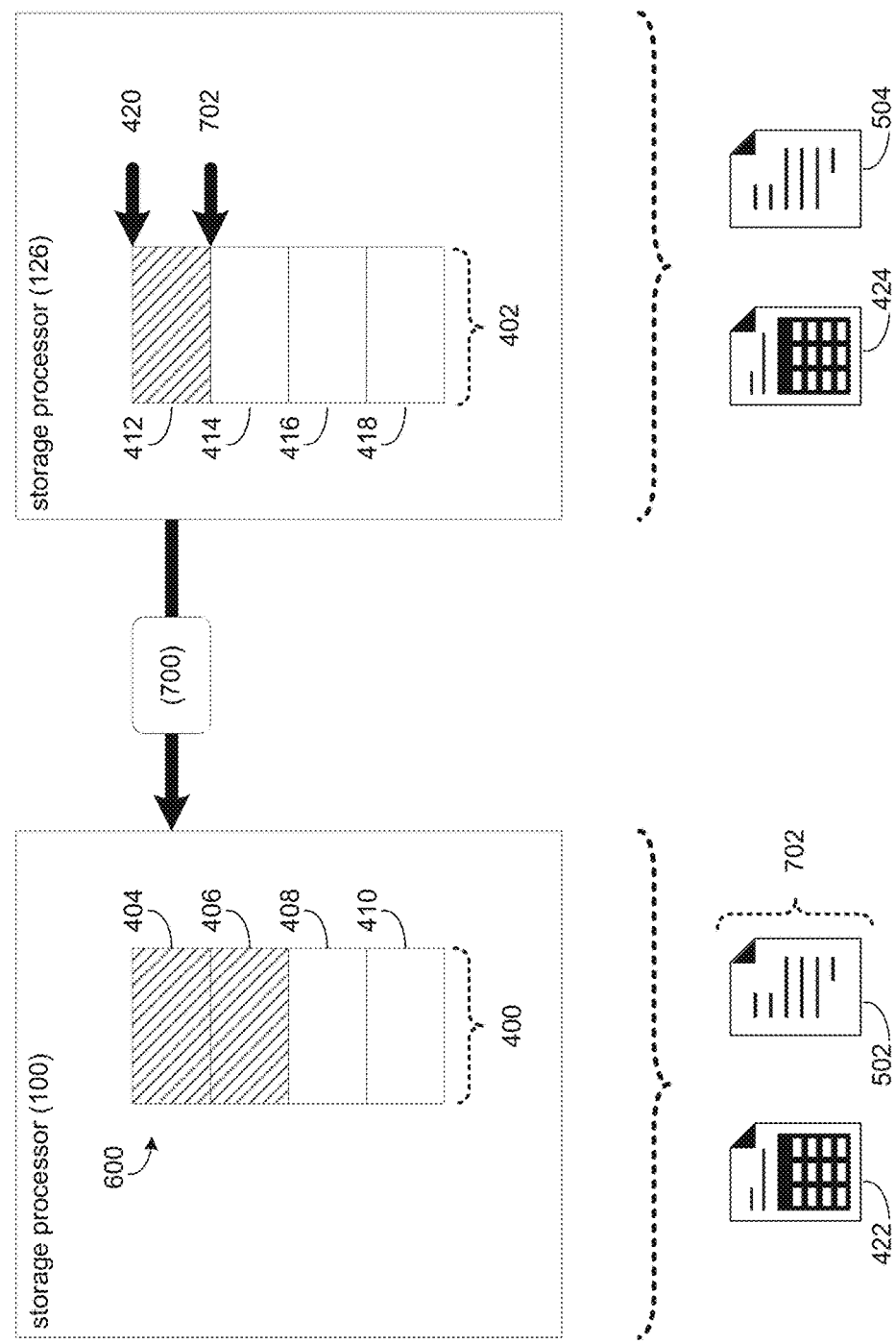

In some implementations, data buffering process 10 may receive 314, from the remote node, an updated target memory address within the remote persistent cache memory system via an RPC response. For example and as discussed above, data buffering process 10 may identify a next free buffer portion from within the remote persistent cache memory system and may provide the memory address for the next free buffer portion to the local node. Referring also to FIG. 7, suppose data buffering process 10 identifies buffer portion 414 as the next free buffer portion within remote persistent cache memory system 402. In this example, data buffering process 10 may return (e.g., using an RPC response (e.g., RPC response 700)) the memory address of the next free buffer portion (e.g., memory address 702 of buffer portion 414) to the local node (e.g., storage processor 100). Accordingly, data buffering process 10 may receive 314, from the remote node (e.g., storage processor 126) an updated target memory address (e.g., memory address 702) within remote persistent cache memory system (e.g., persistent cache memory system 402) for buffering additional data within the remote node (e.g., storage processor 126).

In some implementations, data buffering process 10 may update 316 the list of free buffer portions within the remote persistent cache memory system based upon, at least in part, the updated target memory address. For example and in response to receiving RPC response 700, data buffering process 10 may update the list of free buffer portions (e.g., list of free buffer portions 502) with updated target memory address 702. In some implementations and as discussed above, when new data buffers are allocated by the remote node, data buffering process 10 may add these newly allocated data buffer to the list of free buffer portions (e.g., list of free buffer portions 502) for future remote data buffering requests (e.g., in response to commit requests received on the local node).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving, at a local node, a request to buffer data on a remote persistent cache memory system of a remote node;
   sending, from the local node, a target memory address within the remote persistent cache memory system via a remote procedure call (RPC);
   sending, from the local node, the data to the target memory address within the remote persistent cache memory system via a remote direct memory access (RDMA) command;
   allocating, during initialization of the remote node, at least a portion of the remote persistent cache memory system for buffering data, thus defining one or more buffer portions;
   sending, from the remote node to the local node, a memory address associated with a first buffer portion of the one or more buffer portions; and
   generating a list of free buffer portions within the remote persistent cache memory system.

2. The computer-implemented method of claim 1, wherein the remote persistent cache memory system includes a battery backup random access memory (RAM) system.

3. The computer-implemented method of claim 1, further comprising:
   determining the target memory address within the remote persistent cache memory system for buffering the data based upon, at least in part, the list of free buffer portions within the remote persistent cache memory system.

4. The computer-implemented method of claim 3, further comprising:
   remote persistent cache memory system via an RPC response; and
   updating the list of free buffer portions within the remote persistent cache memory system based upon, at least in part, the updated target memory address.

5. The computer-implemented method of claim 1, wherein the data to buffer on the remote persistent cache memory system of the remote node includes a cache status bitmap.

6. A computer program product residing on a non-transitory computer readable medium having a plurality of instructions stored thereon which, when executed by a processor, cause the processor to perform operations comprising:
   receiving, at a local node, a request to buffer data on a remote persistent cache memory system of a remote node;
   sending, from the local node, a target memory address within the remote persistent cache memory system via a remote procedure call (RPC);
   sending, from the local node, the data to the target memory address within the remote persistent cache memory system via a remote direct memory access (RDMA) command;

allocating, during initialization of the remote node, at least a portion of the remote persistent cache memory system for buffering data, thus defining one or more buffer portions;

sending, from the remote node to the local node, a memory address associated with a first buffer portion of the one or more buffer portions; and generating a list of free buffer portions within the remote persistent cache memory system.

7. The computer program product of claim 6, wherein the remote persistent cache memory system includes a battery backup random access memory (RAM) system.

8. The computer program product of claim 6, wherein the operations further comprise:

determining the target memory address within the remote persistent cache memory system for buffering the data based upon, at least in part, the list of free buffer portions within the remote persistent cache memory system.

9. The computer program product of claim 8, wherein the operations further comprise:

receiving, from the remote node, an updated target memory address within the remote persistent cache memory system via an RPC response; and updating the list of free buffer portions within the remote persistent cache memory system based upon, at least in part, the updated target memory address.

10. The computer program product of claim 6, wherein the data to buffer on the remote persistent cache memory system of the remote node includes a cache status bitmap.

11. A computing system comprising:

a memory; and a processor configured to:

receive, at a local node, a request to buffer data on a remote persistent cache memory system of a remote node;

send, from the local node, a target memory address within the remote persistent cache memory system via a remote procedure call (RPC);

send, from the local node, the data to the target memory address within the remote persistent cache memory system via a remote direct memory access (RDMA) command;

allocate, during initialization of the remote node, at least a portion of the remote persistent cache memory system for buffering data, thus defining one or more buffer portions;

send, from the remote node to the local node, a memory address associated with a first buffer portion of the one or more buffer portions; and generate a list of free buffer portions within the remote persistent cache memory system.

12. The computing system of claim 11, wherein the remote persistent cache memory system includes a battery backup random access memory (RAM) system.

13. The computing system of claim 6, wherein the processor is further configured to:

determine the target memory address within the remote persistent cache memory system for buffering the data based upon, at least in part, the list of free buffer portions within the remote persistent cache memory system.

14. The computing system of claim 13, wherein the processor is further configured to:

receive, from the remote node, an updated target memory address within the remote persistent cache memory system via an RPC response; and update the list of free buffer portions within the remote persistent cache memory system based upon, at least in part, the updated target memory address.

\* \* \* \* \*